Dec. 13, 1949 R. F. DEHN 2,491,363
SHEAR PRESS
Filed Feb. 15, 1947 5 Sheets-Sheet 1

INVENTOR.
BY ROY F. DEHN
Kwis, Hudson, Boughton & Williams
ATTORNEYS

Dec. 13, 1949  R. F. DEHN  2,491,363
SHEAR PRESS

Filed Feb. 15, 1947  5 Sheets-Sheet 3

INVENTOR.
ROY F. DEHN
BY
Kwis, Hudson, Boughton & Williams
ATTORNEYS

INVENTOR.
ROY F. DEHN

Dec. 13, 1949    R. F. DEHN    2,491,363
SHEAR PRESS
Filed Feb. 15, 1947    5 Sheets-Sheet 5
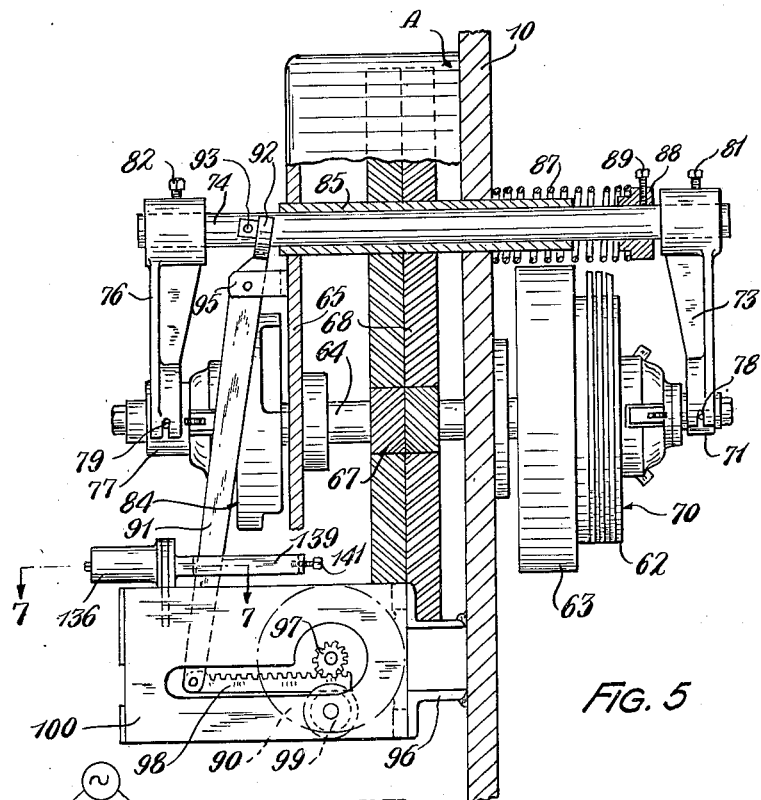
Fig. 5
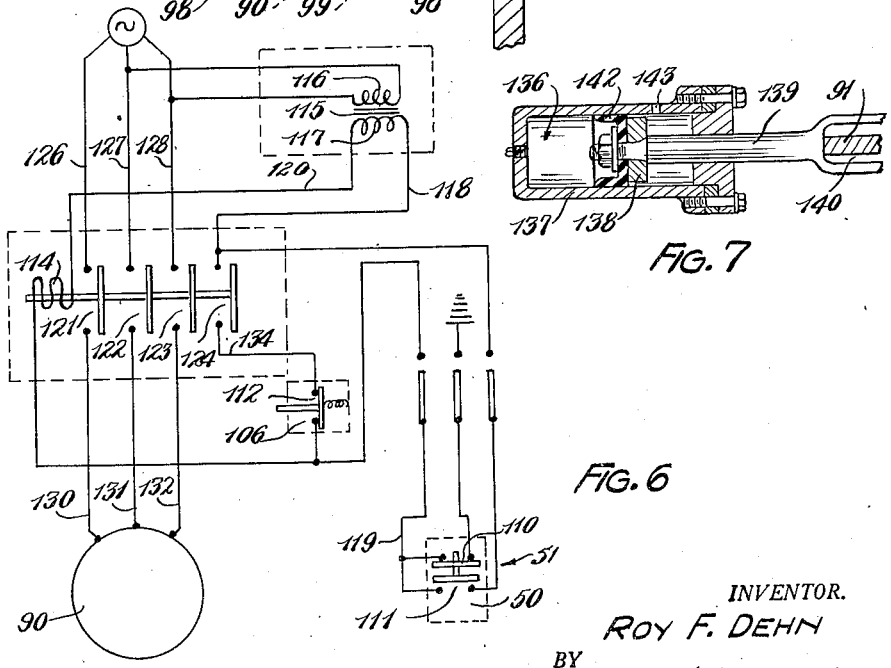
Fig. 7
Fig. 6
INVENTOR.
ROY F. DEHN
BY
Kwis, Hudson, Boughton & Williams
ATTORNEYS Patented Dec. 13, 1949

2,491,363

UNITED STATES PATENT OFFICE 2,491,363

SHEAR PRESS

Roy F. Dehn, Cleveland, Ohio, assignor to The Cleveland Crane & Engineering Company, Wickliffe, Ohio, a corporation of Ohio Application February 15, 1947, Serial No. 728,760

4 Claims. (Cl. 164—105)

This invention pertains to the art of power-operated machine tools of the heavy duty shear press type.

The principal object of the invention is the provision of a new and inmproved heavy duty shear press of the type ordinarily used in shops and other manufacturing plants for the shearing or cutting of relatively large thick sheets of metal or the like, having a large movable shearing blade or member and a selectively actuatable clutch or other intermittent power transmitting means for transmitting power to and moving the shearing member through its cycle of operation, which clutch is actuatable in a positive, simple, and rapid manner by electrically energized means controlled by a readily accessible, easily operable, and freely locatable electric switch or switches.

Another object of the invention is the provision of a new and improved heavy duty shear press or the like of the type referred to having a movable power-operated shearing ram or blade, and a clutch or other intermittent power transmitting means for connecting or disconnecting power to the ram or blade in combination with electrically energized means for actuating the clutch or power transmitting means and effecting or stopping movement of the ram or blade.

Another object of the invention is the provision of a new and improved shear press or the like of the type referred to having a reciprocating or oscillating power-operated ram or blade, in conjunction with a clutch or other intermittently operated power transmitting means interposed between a power source and the ram or blade for controlling movement thereof in combination with electrical means including a torque motor operatively associated with the clutch or other power transmitting means for actuating same when it is desired to effect or stop movement of the ram or blade.

Another object of the invention is the provision of a new and improved shear press or the like of the type referred to having a reciprocating or oscillating power-operated shearing ram or blade supported for movement relative to a preferably fixed bed or edge and having a normal position spaced from such bed, a brake for holding the ram or blade in such normally spaced position, a clutch or other intermittent power transmitting means interposed between a source of power and the movable ram or blade for actuating same when engaged in combination with electrically energized means for disengaging the brake and engaging the clutch and effecting movement of the ram or blade through a cycle of movement including means responsive to the position of the ram or blade for disengaging the clutch and re-engaging the brake as the ram or blade returns to the open or spaced position.

Another object of the invention is the provision of a new and improved shear press or the like of the type referred to having a reciprocating or oscillating power-operated shearing ram or blade supported for movement relative to a preferably fixed bed and having a normal position spaced from such fixed bed, a normally engaged brake for stopping and holding the ram or blade in such normally spaced position, and means controlling the rate of engagement of the brake as the ram or blade returns to its normally spaced position.

Another object of the invention is the provision of a new and improved shear press or the like of the type referred to having a power-operated reciprocating or oscillating shearing ram or blade supported for movement relative to a bed or preferably fixed shearing knife or edge and having a normal position spaced from the bed or fixed shearing knife, a brake for holding the ram or blade in such normally spaced position, a clutch or other intermittent power transmitting means interposed between a source of power and the movable ram or blade for actuating same when engaged, in combination with electrically energized means for disengaging the brake and engaging the clutch and effecting movement of the ram or blade through a cycle of movement, including an electrical holding circuit for maintaining the means electrically energized through at least a single reciprocation or oscillation of the ram or blade and disengaging the clutch and re-engaging the brake as the ram or blade returns to the open or spaced position.

The invention resides in certain constructions and combinations and arrangements of parts, and further objects and advantages will be apparent to those skilled in the art to which it relates from the following description of the preferred embodiment described with reference to the accompanying drawings forming a part of this specification, and in which:

Fig. 5 is a sectional view approximately on the line 5—5 of Fig. 3;

Fig. 6 is a wiring diagram of the electrical controls; and,

Fig. 7 is a sectional view on the line 7—7 of Fig. 5.

Figure 1:
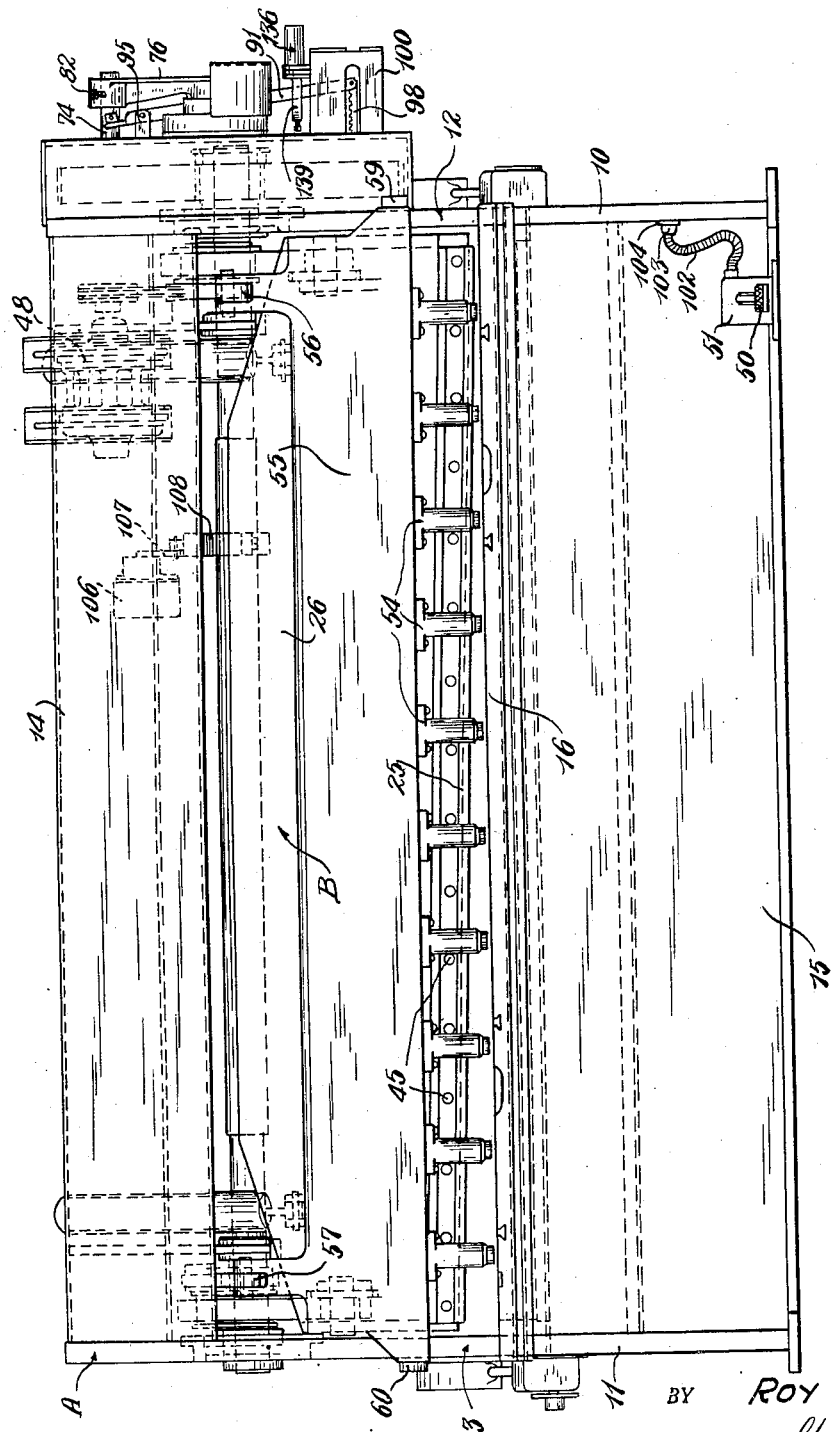
Fig. 1 is a front elevational view of a power-operated, heavy duty shears embodying the present invention.
Figure 2:
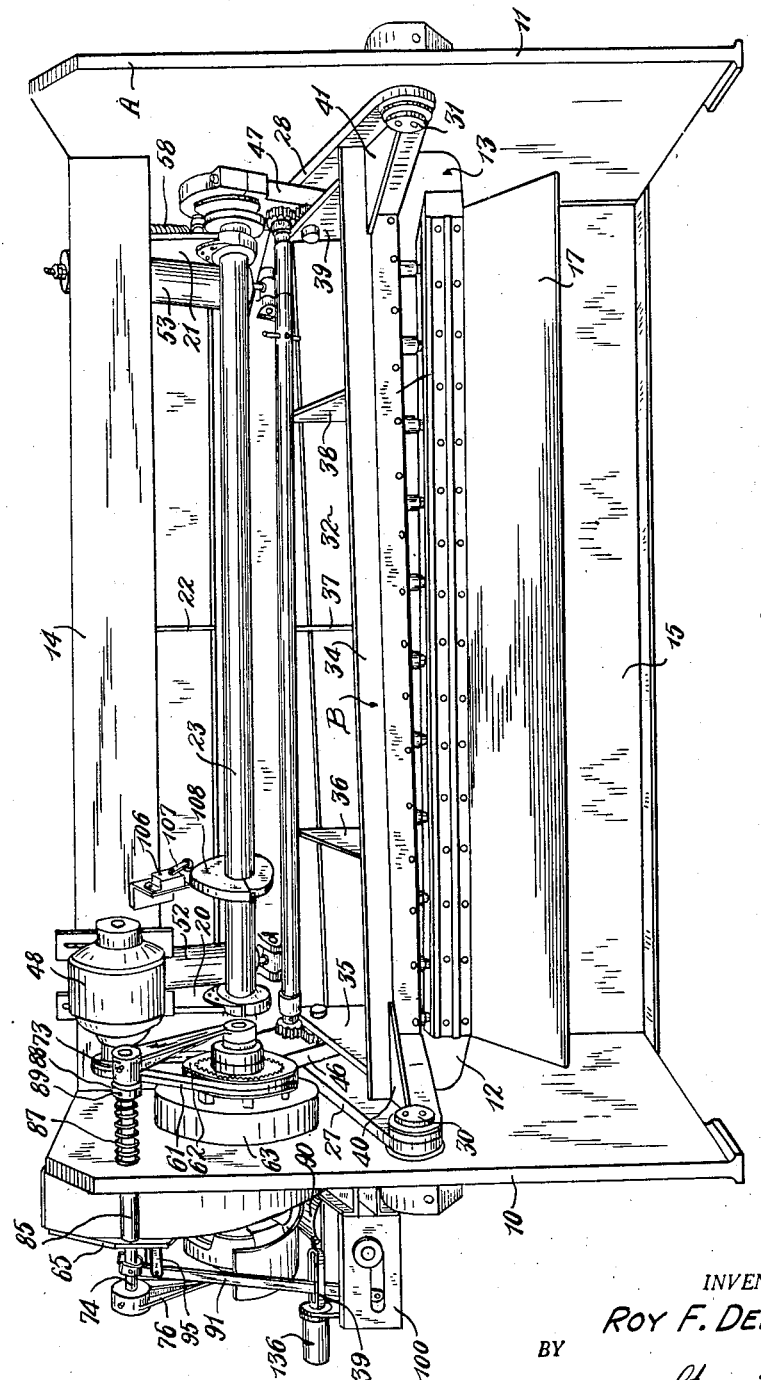
Fig. 2 is a rear view of the shears.

To a large extent, the shears shown herein are similar to the shears shown and described in the patent to William G. Wehr, No. 2,397,896, granted April 2, 1946, and only those parts of the shears which are necessary to a complete understanding of the present invention are herein shown and described in detail. Reference to the aforesaid patent is made for a complete showing and description of those parts of the shears not fully shown and described herein.

Referring to the drawings, the reference character A designates a frame comprising stress-resisting, plate-like end members or side housings 10, 11 having aligned openings 12, 13, respectively, in their front edges, a crown 14, and a bed comprising plate-like members 15, 16, 17, the latter of which forms a scrap chute. The vertical plate-like member 15 is located immediately to the rear of and welded to the horizontal plate-like member 16, which member in addition to reinforcing the upper edge of the member 15, forms a support or work table for the work. The upper member or crown 14 is generally box-shaped in cross section and has its opposite ends welded to the side housings 10, 11 adjacent to their front upper edges. Web members 20, 21, 22 welded to the interior of the member 14 reinforce the same and the lower ends of the members 20, 21 which extend below the rear side of the member 14 form supports for suitable bearings within which a crankshaft 23 is rotatably supported.

The shearing operation is performed by a stationary shearing knife 24 located in a cut-out portion at the upper rear corner of the bed and a movable shearing knife 25 connected to the lower front edge of a movable ram or blade, designated generally by the reference character B. The movable ram or upper blade B which extends substantially from one side of the housing to the other is of built-up construction and comprises a longitudinally extending front plate 26 welded to the front ends of rearwardly extending end members 27, 28, the rear ends of which are rotatably connected to short, shaft-like members 30, 31 rotatably supported in suitable apertures in the side housings 10, 11, respectively, for rotation about an axis eccentric to the axis about which the end members 27, 28 are rotatable. The axis about which the ram or blade B is pivoted is preferably slightly above the plane of the work supporting surface of the bed.

In addition to the front plate 26 and the end members or plates 27, 28, the upper blade or ram B comprises a plate 32 extending between and welded to the end members 27, 28 and a bottom plate 33 having an upwardly extending rear flange 34. The front edge of the bottom plate 33 abuts against and is welded to the rear side of the plate 32 adjacent to the lower edge thereof and the ends of the bottom plate are welded to the end members 27, 28. The blade assembly is reinforced by web members 35, 36, 37, 38, 39 welded to the front plates 26 and 32 and to the bottom plate 33 and by triangular plates 40, 41 welded to the rear side of the bottom plate 33 and the end members 27, 28.

Figure 3:
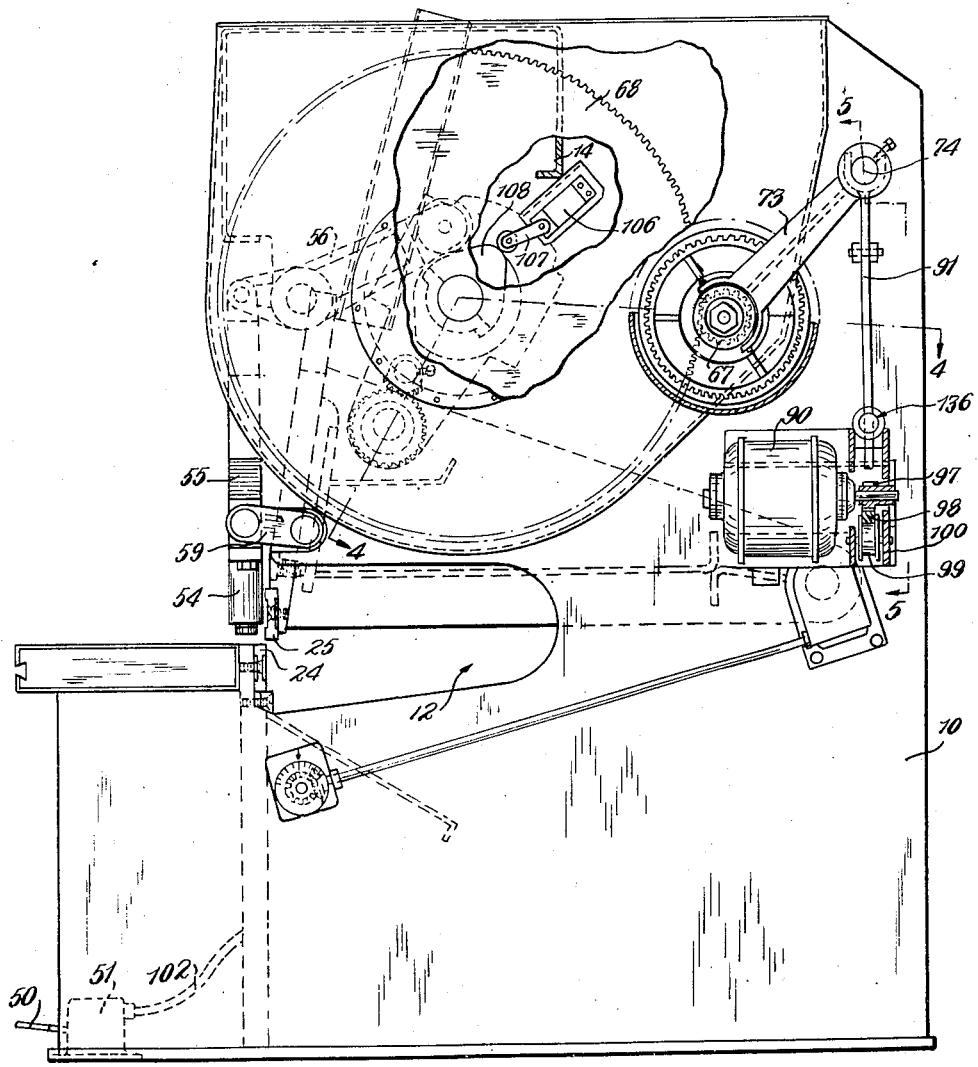
Fig. 3 is an end view of the shears, looking from the right of Fig. 1.

The front plate 26 of the blade B is inclined at a slight angle to the vertical, as clearly shown in Fig. 3, to provide clearance between the ram or blade B and the stationary knife when the blade is oscillated. The lower front edge of the plate 26 is cut out so as to receive the upper shearing knife 25, which knife is held in position therein by a plurality of screws 45 projecting therethrough and threaded into suitably tapped apertures adjacent to the lower edge of the plate 26. The heads of the screws 45 are located in a groove in the front face of the shearing knife and are countersunk so as not to interfere with the oscillation of the movable blade B. The lower edge of the plate 26 is inclined lengthwise so that the knives will effect a true shearing action.

The front end of the ram or movable blade B is supported and the entire blade assembly is adapted to be oscillated about the shafts 30, 31 by pitmans 46, 47, the upper ends of which are operatively connected to eccentrics on the crankshaft 23. The lower ends of the pitmans are connected to short shafts fixed in opposite ends of the blade B. The crankshaft 23 is rotated to reciprocate the movable ram or blade B by an electric motor 48 adjustably secured to the back of the crown 14 and operatively connected to the crankshaft by means including a friction clutch and brake operated in such a manner, as will be presently described, that when the operating pedal 50 of an electric control switch 51 is depressed and immediately released, the crankshaft makes one complete revolution but will continue to rotate as long as the pedal is depressed. As shown, the weight of the movable blade B is counterbalanced by adjustable compression springs, one at either end of the ram, located within tubular housings 52, 53 fixed to the crown member 14.

The shears shown also include a plurality of spring-loaded, hold-down devices 54 detachably bolted to the lower edge of a hold-down plate 55 suspended from the forward arms of bell crank levers 56, 57 pivotally connected to the plates 20, 21, the rear arms of which levers are provided with rollers adapted to engage cams on the crankshaft 23. The levers 56, 57 are continuously urged in a clockwise direction, as viewed in Fig. 3, to engage the rollers thereon with the cams on the crankshaft by suitable compression springs 58 interposed therebetween and the top of the crown member 14. The lower part of the hold-down plate 55 is connected to the side housings 10, 11 by links 59, 60, one at either side of the hold-down plate, pivotally connected to the hold-down plate and to the side housings 10, 11.

The rotor shaft of the motor 48 is connected by a flexible drive connection designated generally as 61 to a grooved pulley or wheel 62 fixed to a flywheel 63 rotatably supported on a shaft 64, which shaft is in turn rotatably supported in suitable bearings fixed to the side housing 10 and to a plate 65 spaced therefrom but connected thereto by an irregularly shaped plate 66 interposed therebetween and the side housing 10. The plates just mentioned form an enclosure or compartment on the outside of the side housing 10 which houses mechanism including a pinion gear 67 keyed to the shaft 64 and in mesh with a large gear 68 keyed to the end of the crankshaft 23.

Figure 4:
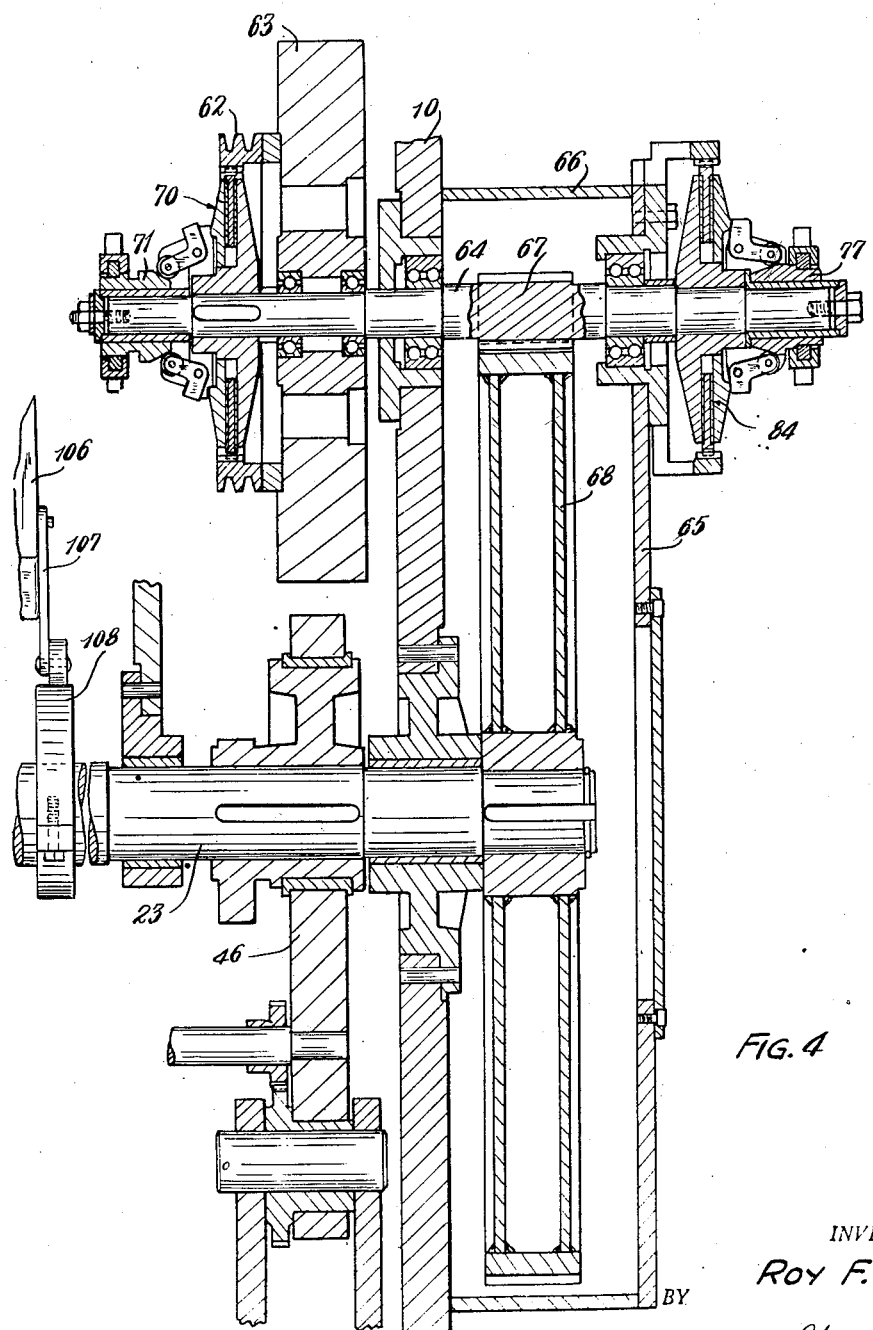
Fig. 4 is a sectional view approximately on the line 4—4 of Fig. 3.

The flywheel 63, which is driven continuously by the motor 48, is adapted to be connected and disconnected with the shaft 64 by which the crankshaft 23 is rotated and the movable blade B oscillated by a friction disc clutch designated generally by the reference character 70, the particular construction of which clutch forms no part of the present invention. Other intermittent power transmitting means could be used if desired. Suffice it to say that the driving member of the clutch is adapted to be clamped between relatively movable driven members by a clutch operating member 71 slidably supported on the left-hand end of the shaft 64, as viewed in Fig. 4, and adapted to be reciprocated therealong by a yoke member 73 fixed to the right-hand end of a rod 74 (see Fig. 5).

The opposite end of the rod 74 is provided with a yoke member 76, the lower end of which is connected to a brake operating member 77. As shown, the yoke members 73, 76 are slotted on their lower ends and engage pins 78, 79 on their respective clutch and brake operating members 71, 77. Preferably the upper ends of the yoke members 73, 76, as viewed in Fig. 5, have bores therethrough for receiving the rod 74 and setscrews 81, 82 for adjustably fixing the members 73, 76, respectively, on the rod in any desired position. The brake operating member 77 is similar to the clutch operating member 71 and when operated actuates or engages a disc type brake designated generally as 84.

The rod 74 is slidably supported by a tubular member 85 fixed in suitable apertures in the end member 10 and the plate 65. As will be seen from Fig. 5, movement of the rod 74 to the right engages the brake 84 and disengages the clutch 70 substantially simultaneously. Similarly, movement of the rod 74 to the left engages the clutch 70 and disengages the brake 84, the action again occurring substantially simultaneously depending upon the exact relative position of the yoke members 73, 76 on the rod 74. If it is desired to have a slight delay between the engagement of the clutch 70 and the disengagement of the brake 84, or vice versa, either the yoke member 73 or 76 or both may be adjusted outwardly the desired amount toward their respective ends of the rod 74.

The invention contemplates means for moving the rod 74 in either direction, which is positive and simple in its operation and yet may be controlled by easily operable and freely locatable hand or foot operated means. In the embodiment shown, the rod 74 is urged continuously to the right (in Fig. 5) by a compression spring 87 surrounding the rod 74 and bearing at one end against the side housing 10 and at the other end against a sleeve or collar 88 adjustably positioned on the rod 74 by a suitable setscrew 89. The spring 87 in urging the rod 74 continuously to the right tends to maintain the brake 84 continuously applied or engaged and the clutch 70 continuously disengaged such that the blade B will always remain in any position at which it was stopped in its movement by engagement of the brake 84.

Electrically energized means, preferably a torque motor 90, is employed to move the rod 74 against the force of the spring 87 through suitable power transmitting mechanism, including a lever arm 91, to disengage the brake 84 and engage the clutch 70. The spring 87 re-engages the brake upon de-energization of the motor 90, the armature of which then rotates freely.

As shown, the lever arm 91 is pivotally supported relative to the frame A on a bracket 95 fixed to the outer or left-hand surface of the plate 65, as viewed in Fig. 5, and has a yoke 92 on its upper end, the ends of which pivotally engage a pin 93 extending transversely through the rod 74. The torque motor 90 is mounted on suitable brackets 96 fixed to the side housing 10 with the axis of rotation of its armature extending in a horizontal fore-and-aft direction. The torque motor 90 actuates the lever 91 through a rack and pinion arrangement, the pinion 97 of which is keyed to the armature of the motor and is continuously in engagement with the rack 98 which is pivoted at its outer or left-hand end to the lower end of the lever 91. The rack 98 is preferably supported in position and held in mesh with the pinion 97 by means of a suitable guide roller 99. A protective housing 100 preferably surrounds the entire mechanism. Alternatively, the lever 91 could be omitted and the rack 98 formed as an extension of or integral with the rod 74.

The torque motor 90 is preferably operated by the electric switch 51 having an operating lever 50 in the form of a pedal. The switch 51 is connected to the control circuits for the torque motor 90 by a flexible wire cable 102 of any desired length and is preferably freely movable around the entire machine within a radius equal to the length of the wire cable 102. The cable 102 may be provided with a detachable plug 103 engageable in one or selectively in a plurality of outlet sockets 104 positioned conveniently around the frame A. If desired, hand switches suitably positioned on the frame A may also be provided.

Preferably, when the switch 51 is closed, the torque motor 90 remains energized and the clutch 70 engaged so long as the switch 51 is closed or, after the switch is opened, until the shearing knife 25 on the blade B has been returned to a position spaced from the stationary shearing knife 24. Preferably, and in normal operation, the switch 51 will be closed for only an instant, long enough to start the blade B moving and complete a suitable holding circuit, at which time the switch 51 may be opened without de-energizing the torque motor 90 until the blade B has completed a full cycle of movement. The holding circuit is preferably completed through and broken by a normally closed limit switch 106 preferably fixed to the back of the crown 14 and having an operating arm 107 engageable with a cam 108 fixed on the crankshaft 23. The high point of the cam 108 is positioned circumferentially on the crankshaft 23 relative to the position of the eccentrics which operate the blade B such that the cam will open the normally closed limit switch 106 at a point in the cycle of movement of the blade B such that the brake 84 will be re-engaged or re-applied to stop the movement of the blade B as it reaches the top of its cycle or the maximum spacing of the movable shearing knife 25 from the stationary shearing knife 24.

Referring to Fig. 6, it will be seen that the electric switch 51 has a pair of normally closed contacts 110 and a pair of normally open contacts 111, while the limit switch 106 has a pair of normally closed contacts 112. A relay 114 having a plurality of normally open contacts is provided for energizing the torque motor 90 for rotation in the appropriate direction, which motor is preferably of the three-phase alternating current type, and for completing a suitable holding circuit in conjunction with the limit switch 106 whereby the blade B will always be stopped at the top of its cycle of movement regardless of the length of time the switch 51 is closed. A transformer 115 having a primary 116 connected to one phase of the source of alternating current for the torque motor 90 provides from its secondary 117 a relatively low control voltage suitable for energizing the energization coil of the relay 114.

When the switch 51 is actuated, the normally open contacts 111 are closed, completing a circuit from one terminal of the secondary 117 through wire 118, the now closed contacts 111, wire 119, the energization coil of the relay 114, and thence through the wire 120 to the other terminal of the secondary 117. Energization of the relay 114 closes its normally open contacts 121, 122, 123, 124. Closing of the normally open contacts 121, 122, 123 completes a circuit from wires 126, 127, 128, preferably connected to a suitable multiphase voltage source, to the wires 130, 131, 132, all respectively, and thence to the power terminals of the torque motor 90, thus energizing same and causing it to rotate in an appropriate direction for disengaging the brake 84 and engaging the clutch 70. Engagement of the clutch 70 actuates the crankshaft 23 and thus the blade B. Rotation of the crankshaft 23 moves the high point of the cam 108 away from the actuating arm 107 of the limit switch 106 so that the normally closed contacts 112 of the limit switch 106 are closed. Closing of the normally open contact 124 completes a holding circuit from the wire 118 through the now closed contact 124, wire 134, the now closed normally closed contacts 112 of the limit switch 106, to the wire 119, and maintains the relay 114 energized even though the normally open, now closed, contact 111 of the switch 51 be subsequently opened. As the crankshaft 23 completes the revolution or its cycle of movement following the opening of contact 111 of the switch 51, the high point of the cam 108 engages the operating arm 107 of the limit switch 106 and opens the normally closed contacts 112, thus breaking the energization circuit for the relay 114, opening the contacts 121, 122, 123, and de-energizing the motor 90. The compression spring 87, which the torque of the motor 90 had been opposing when energized, moves the rod 74 to the right, disengages the clutch 70, and re-engages the brake 84, braking the blade and other moving parts to a stop at a point in the movement of the blade B where the movable shearing knife 25 is spaced the maximum distance from the stationary shearing knife 24.

Provision is made for cushioning or controlling the rate of re-application or re-engagement by the spring 87 of the brake 84, upon de-energization of the torque motor 90, so as to prevent chattering or undue stress in the members. In the embodiment of the invention shown a dashpot 136, comprising a cylinder 137 mounted on the housing 100 and a piston 138 having a connecting rod 139, is provided for this purpose. The connecting rod 139 has a lost-motion type of connection with the lever arm 91, which connection comprises an elongated longitudinal opening 140 in the rod 139 through which the lever arm 91 passes, the lever arm 91 being free to pivot on its supporting bracket 95 within the limits of the length of the opening 140. Each end of the opening 140 serves as an abutment or stop against which the sides of the lever arm 91 engage approximately at the ends of its limits of travel or as the brake 84 or clutch 70 are about to be engaged. An adjustable stop in the form of a threaded bolt 141 is provided to control the amount of free travel of the lever 91. When the torque motor is energized, the lever 91 moves freely to the right as viewed in Figs. 5 and 7 until it engages the end of the bolt 141, at which time the piston 138 is moved forcefully to the right. Movement of the piston to the right creates a vacuum in the left hand end of the cylinder 137 into which air then flows, the cup-type packing 142 on the piston 138 serving as a form of one-way check valve. The right hand end of the cylinder is vented by a vent 143. When the torque motor 90 is de-energized, the spring 87 rapidly moves the rod 74 to the right and the lower end of the lever 91 to the left. The lever 91 moves freely until it reaches the opposite end of the opening 140 from the adjusting bolt 141, at which time the piston 138 is moved to the left and compresses the air in the left hand end of the cylinder 137, the pressure of which air on the pressure face of the piston 138 yieldingly and in increasing amounts opposes further movement of the piston 138 and thus the lever 91. A cushioning effect results against the force of the spring 87 and slows the rate of re-engagement of the brake 84. If such cushioning is unnecessary, the dashpot may be omitted.

Thus it will be seen that an embodiment of the invention has been shown and described in considerable detail which accomplishes the objects of the invention, provides an easily and simply controlled and operated shear press, permits operation of the press from any convenient location, cushions the stopping of the moving blade, and assures that the blade will always stop in the open or spaced position from the fixed blade.

Having thus described my invention in connection with the preferred embodiment and its preferred method of use, it will be obvious that variations both in structure and appearance will occur to others upon a reading and understanding of the above, which variations utilize and embody the invention, and it is my intention to cover all such modifications and variations insofar as covered by the appended claims.

Having thus described my invention, I claim:

1. A heavy duty shear press or the like of the type referred to comprising in combination: a frame including an elongated bed, a movable ram or blade supported in said frame for movement relative to said bed, a member adapted to be driven from a source of energy, a mechanism for connecting and disconnecting said member to said ram or blade including intermittently actuatable power transmitting means, and means including an electrically energized torque motor associated with said power transmitting means for actuating same, a switch accessible to the operator of the shear press for energizing said torque motor for engaging said power transmitting means and moving said ram or blade, an electrical holding circuit for continuing the energization of said motor after initial energization thereof, and a switch responsive to the position of said ram or blade for breaking said holding circuit as said ram or blade completes a cycle of movement.

2. A heavy shear press or the like of the type referred to comprising in combination: a frame including a bed, a movable blade supported in said frame for movement towards and away from said bed, a member adapted to be driven from a source of energy, a mechanism including a clutch for connecting and disconnecting said member to said blade to effect movement of the latter, spring means cooperating with said clutch to normally hold the latter disengaged, an electrically operated torque motor, operative connections between said torque motor and said clutch for effecting engagement of said clutch when said torque motor is energized, and electrical circuit means for controlling the energization of said torque motor including an operator actuated switch adapted when actuated to close an energizing circuit for said motor, means providing a holding circuit about said switch for continuing the energization of said motor upon release of said switch after actuation thereof, and a switch responsive to the position of said blade for breaking said holding circuit when said blade completes a cycle of movement.

3. A heavy duty shear press or the like of the type referred to comprising in combination: a frame including a bed, a movable blade supported in said frame for movement towards and away from said bed, a rotatable member supported by said frame and adapted to be driven from a source of energy, a mechanism including a clutch for selectively connecting and disconnecting said rotatable member to said blade for moving the latter, a brake means associated with said rotatable member for braking the movement thereof, a common mechanical actuating means for said clutch and said brake, spring means cooperating with said clutch and brake actuating means and normally urging the latter to a position in which the clutch is disengaged and the brake is applied, an electrically operated torque motor, operative connections between said torque motor and said common actuating means adapted to move the latter against the force of said spring means when said torque motor is energized, and electrical circuit means controlling the energization of said torque motor, the said circuit means including an operator actuated switch adapted when actuated to close an energizing circuit for said motor, means providing a holding circuit around said operator actuated switch for continuing the energization of said motor upon release of said switch after actuation thereof, and switch means responsive to the position of said blade for braking said holding circuit when said blade completes a cycle of movement.

4. A heavy duty shear press as defined in claim 3 and further comprising dashpot means operatively associated with said common actuating means for controlling the rate of reengagement of said brake when said last-mentioned switch means has effected deenergization of said motor.

ROY F. DEHN.

REFERENCES CITED

The following references are of record in the file of this patent:

UNITED STATES PATENTS

| Number | Name | Date |
| --- | --- | --- |
| 843,076 | Detrick | Feb. 5, 1907 |
| 1,289,522 | Newson | Dec. 31, 1918 |
| 1,385,369 | Ferrier | July 26, 1921 |
| 1,606,559 | Clarke | Nov. 9, 1926 |
| 1,621,384 | Thropp | Mar. 15, 1927 |
| 1,790,791 | Bruneel | Feb. 3, 1931 |
| 1,993,413 | Mellon | Mar. 5, 1935 |
| 2,018,720 | Hodgson | Oct. 29, 1935 |
| 2,065,820 | Mellon | Dec. 29, 1936 |
| 2,213,450 | Munschauer | Sept. 3, 1940 |
| 2,250,882 | Williamson | July 29, 1941 |
| 2,279,597 | Selmer | Apr. 14, 1942 |
| 2,323,619 | Panish | July 6, 1943 |